United States Patent [19]

Förnsel et al.

[11] Patent Number: 4,761,706

[45] Date of Patent: Aug. 2, 1988

[54] METHOD FOR GENERATING A TRIPPING SIGNAL AS A FUNCTION OF THE MAGNITUDE AND THE DURATION OF AN OVERCURRENT

[75] Inventors: Helmut Förnsel; Hans-Eberhard Simmel, both of Karlsruhe, Fed. Rep. of Germany

[73] Assignee: Siemens Aktiengesellschaft, Munich, Fed. Rep. of Germany

[21] Appl. No.: 874,084

[22] Filed: Jun. 13, 1986

[51] Int. Cl.[4] .............................................. H02H 3/00
[52] U.S. Cl. ...................................... 361/94; 361/87; 364/483
[58] Field of Search .................. 361/87, 93, 94, 96, 361/97; 364/483

[56] References Cited

U.S. PATENT DOCUMENTS

| 4,017,766 | 4/1977 | Vercellotti et al. | 361/94 X |
| 4,219,860 | 8/1980 | Depuy | 361/96 X |
| 4,291,355 | 9/1981 | Dinger | 361/96 X |

FOREIGN PATENT DOCUMENTS 2047995  12/1980  United Kingdom .

Primary Examiner—A. D. Pellinen
Assistant Examiner—Derek S. Jennings
Attorney, Agent, or Firm—Kenyon & Kenyon

[57] ABSTRACT

A method for generating a tripping signal as a function of an overcurrent. Sampled measurement values are converted into digital values which are weighted and added up according to a predetermined function. If the sum value is above a predetermined reference value, the tripping signal is formed. In order to cancel the addition before the tripping signal is formed in dependence on the wave shape of the overcurrent if the overcurrent is decaying, the digital values of the respective last period of time corresponding to at least a half-period of the overcurrent are stored and a comparison of all digital values simultaneously stored with each other is made. The determined largest stored value is weighted and added up as a digital value and the addition is cancelled if a largest digital value is below the predetermined threshold.

3 Claims, 1 Drawing Sheet

METHOD FOR GENERATING A TRIPPING SIGNAL AS A FUNCTION OF THE MAGNITUDE AND THE DURATION OF AN OVERCURRENT

BACKGROUND OF THE INVENTION

The present invention relates to a method for generating a tripping signal as a function of the magnitude and the duration of an overcurrent, in which a rectified measurement variable derived from the overcurrent is sampled and the sampled measurement values are converted into corresponding digital values, the digital values are then weighted according to a predetermined function and summed accordingly and a tripping signal is formed if the sum value is above a predetermined reference value and the summation is cancelled before the tripping signal is formed, if the overcurrent drops below a given threshold for a period of time.

A known monitoring equipment which is described in DE-OS No. 29 50 031 (see U.S. Pat. No. 4,219,860) operates in accordance with such a method, since in this known monitoring equipment a measurement value obtained by rectification from the current to be monitored is sampled by means of the sampling circuit and the sampled values so obtained are converted into corresponding digital values in an A/D converter. The digital values are weighted in a function generator and added up after being weighted in an adding circuit. If the state of the adding circuit reaches a predetermined reference value, a tripping signal is generated. In the known monitoring equipment, the A/D converter is followed by a circuit module which checks continuously whether the current to be monitored has overcurrent values. As long as this is the case, a clock-controlled counter following the circuit module is reset continuously. If the resetting signal of the circuit module fails to arrive, the clock-controlled counter runs up to a predetermined counter reading and then resets the adding circuit. So that resetting of the adding circuit does not occur when, due to the waveform of the rectified measurement value, the instantaneous values drop below a value characterizing an overcurrent value, the predetermined counter must be designed so that in the known monitoring device this counter reading can be reached only after a time which is longer than the duration of a half-wave of the current to be monitored. This can lead to a situation whereby, in isolated cases, tripping takes place needlessly. In any case, the known monitoring equipment for currents of 50 or 60 Hz to be monitored, which operates in accordance with the described method, requires counters which are set differently with respect to the critical counter reading.

SUMMARY OF THE INVENTION

It is therefore an object of the present invention to provide a method for generating a tripping signal as a function of the magnitude and duration of an overcurrent, in which the instant of cancellation of the adding process depends directly on the waveform of the measurement variable as the overcurrent is decaying and thus takes place approximately after one half-wave of the current to be monitored, independently of the frequency of the current to be monitored for overcurrent values, and which can be carried out with a relatively small amount of circuitry.

The above and other objects of the present invention are achieved by a method for generating a tripping signal for a circuit interrupter as a function of the magnitude and duration of an overcurrent comprising the steps of:

sampling a rectified measurement variable derived from the overcurrent and converting the sampled measurement values into corresponding digital values, weighting the digital values according to a predetermined function, summing the values and generating the tripping signal if the sum value is above a predetermined reference value, cancelling the summation before the tripping signal is formed if the overcurrent falls below a predetermined threshold for a period of time, storing the digital values of the respective last time interval corresponding to at least one half period of the overcurrent, comparing all then stored digital values with each other, weighting the largest stored digital value determined in each comparison and summing said largest stored digital values as said sum value, and cancelling the summation if the largest digital value is below the predetermined threshold.

According to the invention, the digital values of the respective last period of time corresponding at least to a half-period of the overcurrent are stored, and a comparison of all then stored digital values with each other is performed. The highest stored digital value determined in each comparison is weighted and added up as a sum digital value, and if the largest digital value has a magnitude below a predetermined threshold, the addition is cancelled.

It is a substantial advantage of the method according to the invention that a device operating according to this method can be designed independently of the frequency of a current to be monitored for overcurrent values, because stopping or clearing the summation process for a decaying overcurrent is not brought about by a counter running up to a predetermined counter reading, but takes place if, after the overcurrent values are stored, a value is determined for the first time due to the comparison as the highest stored value which is below a predetermined threshold and does not represent an overcurrent value. As a rule this will be the case for the crest value of the first half-wave which is below the predetermined threshold. Clearing the addition therefore always takes place in dependence on the actual waveform of the measurement quantity. It is a further advantage that the method can be carried out with a comparatively small amount of circuitry since only digital values are weighted and added up which correspond to crest values of the rectified measurement value, and this only as long as the digital values do not fall below a predetermined threshold.

In the method according to the invention, it has been found to be advantageous if a comparison of all digital values stored at the same time with each other takes place at a rate which is lower than the sampling rate at which the rectified measurement quantity is sampled. Such an embodiment of the method according to the invention is advantageous particularly with respect to its practical execution, because an arrangement for carrying out this embodiment of the method according to the invention requires a relatively small amount of technical means. This is due to the fact that only a relatively modest amount of technical means is required for carrying out the comparison. If the method according to the invention is carried out with a microcomputer, which comprises the preferred embodiment for performing the method, it can be carried out with a microcomputer of relatively small capacity. While in this embodiment of the method according to the invention, the summation may be cancelled in some circumstances somewhat delayed due to the lower comparison rate as compared to the sampling rate, which may further lead to the generation of a tripping signal, the reduction of the technical means which, by the way, also extends to the embodiment of the arrangement for performing the summation, predominates over the mentioned disadvantage.

It goes without saying that with the mentioned method according to the invention, a comparison of all the then stored digital values with each other can be made also with every newly stored value, but this is at the expense of the technical means required in carrying out the method according to the invention, while, however, a relatively high measuring accuracy is achieved.

If in the method according to the invention a sampling rate $f_1$ above the comparison rate $f_2$ is chosen, the comparison rate is to be chosen in the case of a full-waverectified measurement value of an overcurrent of the frequency $f_s$ and wherein N digital values are simultaneously storable according to the relation:

$$f_2 \geq f_1/N, \text{ where } N \geq \frac{1}{2} \cdot f_1/f_s.$$

BRIEF DESCRIPTION OF THE DRAWINGS

The invention will now be explained in greater detail in the following detailed description with reference to the drawings, in which.

DETAILED DESCRIPTION

Figure 2:
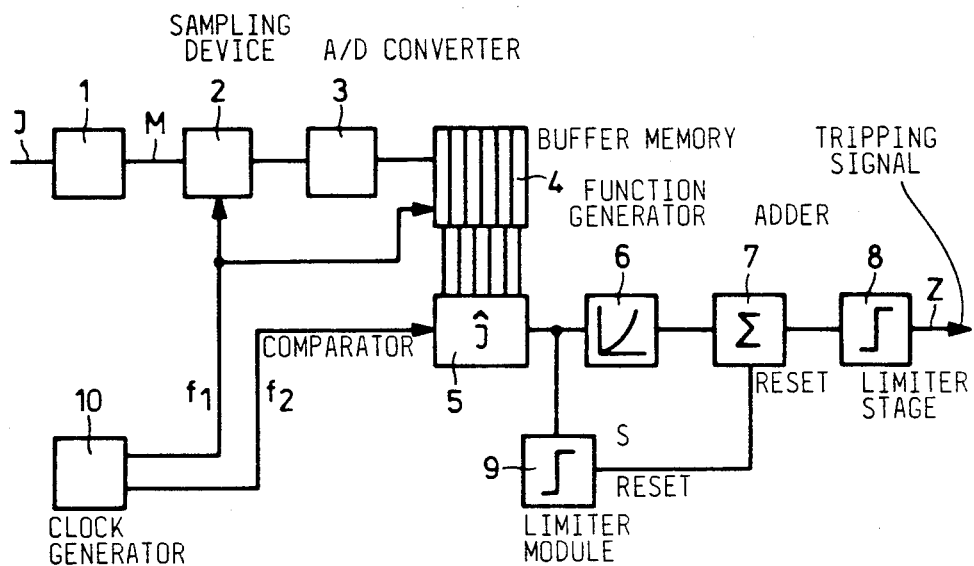
FIG. 2 is a block diagram of a circuit arrangement according to the invention, although the block diagram is merely illustrative since the preferred method according to the invention is preferably implemented using a microcomputer.

With reference now to the drawings, for carrying out the method according to the invention, a rectified measurement value M is obtained from a current J to be monitored which is accomplished by means of the rectifier arrangement 1 (see FIG. 2). This rectified measurement variable M is sampled at a frequency $f_1$, which is accomplished for purposes of illustration in FIG. 2 by means of a sampling device 2. The sampled measurement values are converted into digital values, which is shown in FIG. 2 by an analog-digital converter 3. The digital values are stored in the order of their appearance which is accomplished in the block diagram according to FIG. 2 in a buffer memory 4 with N=6 storage locations. Each of the storage locations of the buffer memory 4 is connected to a comparator arrangement 5, in which the respective simultaneously stored digital values are compared with each other. In the present case, the six measurement values which are sampled last and converted into digital form are stored, so that accordingly, the highest stored digital value is determined from these last six stored values in the comparator arrangement 5.

This largest stored value is weighted in accordance with a predetermined function, particularly a function $f = J^2 \times t$, where t designates time. To illustrate this process, a function generator 6 is shown in FIG. 2, which is followed by an adder 7. In this adder, the weighted values furnished by the function generator 6 are summed. If the adding in the adder 7 yields a predetermined value, a tripping signal Z is generated. In the block diagram shown, a limiter stage 8 is shown for this purpose which is set to the predetermined limit.

Figure 1:
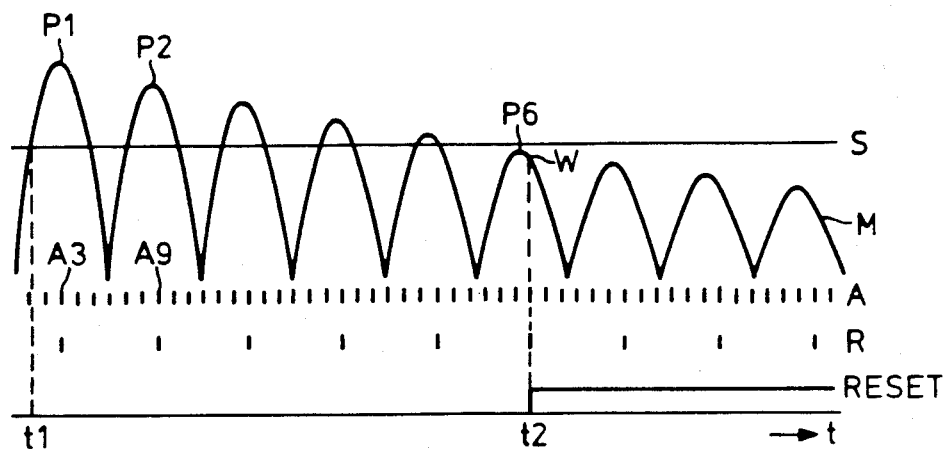
FIG. 1 shows several waveforms employed in explaining the invention.

As further shown in FIG. 2, the values which are furnished by the comparator arrangement 5 and correspond to the respective largest value stored in the buffer memory 4, are also fed to a limiter module 9 to be examined for whether the digital value furnished by the comparator arrangement 5 is above or below a predetermined threshold S, as is shown in FIG. 1. If a digital value from the comparator arrangement 5 is below the predetermined threshold S, a reset signal is issued by the limiter module 9 to the adder 7, whereby the summation is cancelled. Accordingly, a tripping signal Z is not generated.

In FIG. 1 is shown, besides the preset threshold S, an example of a waveform of a measurement variable M versus time t, where this measurement variable M is to be obtained in the assumed case by full-wave rectification from a single phase current J to be monitored. A waveform of the measurement variable M is assumed which initially drops from values above the predetermined threshold S to values which are below the threshold S. The sampling rate of the measurement variable M is shown as A; the sampling rate A is determined by the frequency $f_1$ of a clock generator 10 which also supplies the buffer memory 4 with this frequency $f_1$.

In FIG. 1, waveform pulses R are at a frequency at which the comparison of all simultaneously stored digital values takes place by means of the comparator arrangement 5; this rate is determined by the frequency $f_2$ of the clock generator 10. As explained above, if a faster computer is provided for implementing the invention, $f_1$ and $f_2$ can be the same frequency.

Regarding the course of the method according to the invention, it should first be noted, making reference to FIGS. 1 and 2, that upon the appearance of an overcurrent, an excitation circuit, not shown, responds, whereupon the sampling of the rectified measurement variable is performed. This happens at the time t1. Then, the individual storage locations of the buffer memory 4 are occupied by samples of the rectified measurement variable by means of the subsequent sampling pulses. The respective highest stored value, initially the crest value P1, is determined by the comparator arrangement 5 for the first pulse R and fed to the function generator 6 as well as to the limiter module 9. Since this value P1 is above the threshold S, the adder 7 is not reset.

With the sampling pulse A9, the crest value P2 of the following half-wave is determined and is entered into the buffer memory 4 as the respective last current value. With the sampling pulse A9, a further comparison of the pulses stored simultaneously in the buffer memory 4 takes place on the basis of the comparison rate (second pulse R), so that then a digital value arrives at the limiter module 9 which corresponds to the crest value P2 and therefore is also above the preset threshold S. This process is repeated for each subsequent half-wave until at the time t2, upon the corresponding sampling pulse, a value W is sampled which nearly corresponds to the crest value P6. This value W then represents the largest value then stored in the buffer memory 4 since the digital value corresponding to the preceding crest value has run out of the memory 4. The comparator arrangement 5 therefore determines at the time t2 that the largest stored value is below the predetermined threshold S, whereupon a reset signal is delivered by the limiter module 9 to the adder 7, whereupon the summation is cancelled; a tripping signal Z does not occur (if one has not already been issued). It can therefore be achieved with the method according to the invention that a tripping signal is generated in dependence on the waveform of a measuring variable derived from the current to be monitored if this is required according to the characteristics of the equipment to be monitored, but an unnecessary output of a tripping signal Z is prevented if the current drops before below a predetermined threshold.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for generating a tripping signal for a circuit interrupter as a function of the magnitude and duration of an overcurrent of an alternating current waveform, comprising the steps of:

sampling a rectified measurement variable derived from the overcurrent and converting the sampled measurement values into corresponding digital values, weighting the digital values according to a predetermined function, summing the digital values and generating the tripping signal if the sum value is above a predetermined reference value, and cancelling the summation before the tripping signal is generated if the overcurrent falls below a predetermined threshold for a period of time, and further comprising the steps of:

storing the digital values of the respective last time interval corresponding to at least one half period of the overcurrent before said step of weighting, and comparing all then stored digital values with each other, said step of weighting comprising weighting the largest stored digital value determined in each comparison and summing said largest stored digital values as said sum value, and said step of cancelling comprising cancelling the summation if the largest digital value is below the predetermined threshold.

2. The method recited in claim 1, wherein said step of comparing comprises comparing all then stored stored digital values with each other at a rate which is less than the sampling rate with which the rectified measurement variable is sampled.

3. The method recited in claim 2, wherein with a full-wave rectified measurement variable of an overcurrent having a frequency $f_2$, a sampling rate $f_1$ and with N digital values that can simultaneously be stored, a comparison rate $f_2$ is chosen according to the relationship $f_2 \geq f_1/N$.

* * * * *